United States Patent [19]

Tani

[11] Patent Number: 5,216,511
[45] Date of Patent: Jun. 1, 1993

[54] IMAGING DEVICE WITH ELIMINATION OF DARK CURRENT

[75] Inventor: Nobuhiro Tani, Tokyo, Japan

[73] Assignee: Asahi Kokaku Kogyo Kabushiki Kaisha, Tokyo, Japan

[21] Appl. No.: 705,669

[22] Filed: May 24, 1991

[30] Foreign Application Priority Data

May 25, 1990 [JP] Japan .................... 2-136523

[51] Int. Cl.⁵ .................. H04N 3/14; H04N 5/335
[52] U.S. Cl. .................... 358/213.16; 358/213.15
[58] Field of Search ............ 358/213.16, 213.18, 358/213.15, 209, 909, 213.22

[56] References Cited

U.S. PATENT DOCUMENTS

| | | | |
|---|---|---|---|
| 4,580,170 | 4/1986 | Levine | 358/213.16 |
| 4,589,025 | 5/1986 | Monahan et al. | 358/213.16 |
| 4,758,883 | 7/1988 | Kawahara et al. | 358/44 |
| 4,814,881 | 3/1989 | Makino | 358/167 |
| 4,839,729 | 6/1989 | Ando et al. | 358/213.16 |
| 4,992,877 | 2/1991 | Takayama | 358/213.15 |

FOREIGN PATENT DOCUMENTS

| | | |
|---|---|---|
| 0205189 | 12/1986 | European Pat. Off. . |
| 0357084 | 3/1990 | European Pat. Off. . |
| 0396045 | 11/1990 | European Pat. Off. . |
| 53-123617 | 10/1978 | Japan .................. 358/213.16 |
| 59-019483 | 1/1984 | Japan .................. 358/213.16 |
| 2-31571 | 2/1990 | Japan . |
| 2-162976 | 6/1990 | Japan . |
| 2187060 | 8/1987 | United Kingdom . |

OTHER PUBLICATIONS

British Search Report.

Primary Examiner—James J. Groody
Assistant Examiner—Safet Metjahic
Attorney, Agent, or Firm—Sandler, Greenblum & Bernstein

[57] ABSTRACT

A control device includes a control mechanism for eliminating an effect of dark current generated in a CCD which may be, for example, provided in a still video system operated in a frame mode. The control mechanism controls the imaging device in such a manner that, after an aperture is closed, the imaging device outputs an image signal from a first field and an image signal from a second field, and then outputs data from a third field corresponding to a dark current component. The control mechanism thereafter subtracts the data of the third field from the image signal of the second field. The data obtained by this subtraction is outputted together with the image signal of the first field, as a one frame image signal.

12 Claims, 4 Drawing Sheets

5,216,511

IMAGING DEVICE WITH ELIMINATION OF DARK CURRENT

BACKGROUND OF THE INVENTION

1. Field of the Invention

The present invention relates to a control device for controlling an imaging device, the control device providing a required effect when applied to an electronic still video camera.

2. Description of the Related Art

In an electronic still video camera, when an object is photographed, an image signal corresponding to the object is outputted by an imaging device such as a CCD (Charge Coupled Device), and is recorded in a video floppy disk. During this operation, in a frame mode in which one frame is formed by a first field and a second field, an image signal from the second field is held in photodiodes from the imaging device while an image signal of the first field is read out from the imaging device. Therefore, when the image signal is read out after an aperture is closed, a dark current is generated in the photodiodes during this period, and thus noise occurs in the second field due to the presence of the dark current, which noise may cause a flickering of the frame formed by the first and second fields.

SUMMARY OF THE INVENTION

Therefore, an object of the present invention is to provide a control device which prevents image deterioration of an image due to the presence of dark current.

According to the present invention, there is provided a control device comprising an aperture for controlling an exposure to an imaging device, and an eliminating mechanism for eliminating an effect on an image signal of a second field, which is caused by a dark current generated in the imaging device. This effect is eliminated, after the aperture is closed, whereby one frame image signal is formed by a first field and by the second field from which the effect of the dark current is eliminated.

Further, according to the present invention, there is provided a control device comprising an aperture for controlling an exposure to an imaging device, and a control circuit for controlling the imaging device. Under the control of the control circuit, and after the aperture is closed, the imaging device outputs image signals of first and second fields, and thereafter outputs data of a third field corresponding to a dark current. The control circuit then outputs a signal obtained by subtracting the data of the third field from the image signal of the second field, together with the image signal of the first field, as a one frame image signal.

Furthermore, according to the present invention, there is provided a control device comprising an A-D converter, a memory which storer at least one frame of data outputted by the A-D converter, a photometry circuit, an aperture, and a control circuit. The A-D converter A-D converts an output of an imaging device. The memory stores at least one frame of data outputted by the A-D converter. The photometry circuit measures an exposure of an object. The aperture controls an exposure to the image device in accordance with an output of the photometry circuit. The control circuit controls the imaging device in such a manner that after the aperture is closed, the imaging device outputs data of a third field corresponding to a dark current after outputting image signals of first and second fields corresponding to the object, and then outputs a signal as a one frame image signal which is obtained by subtracting the data of the third field from the image signal of the second field, together with the image signal of the first field, as one frame image signal.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
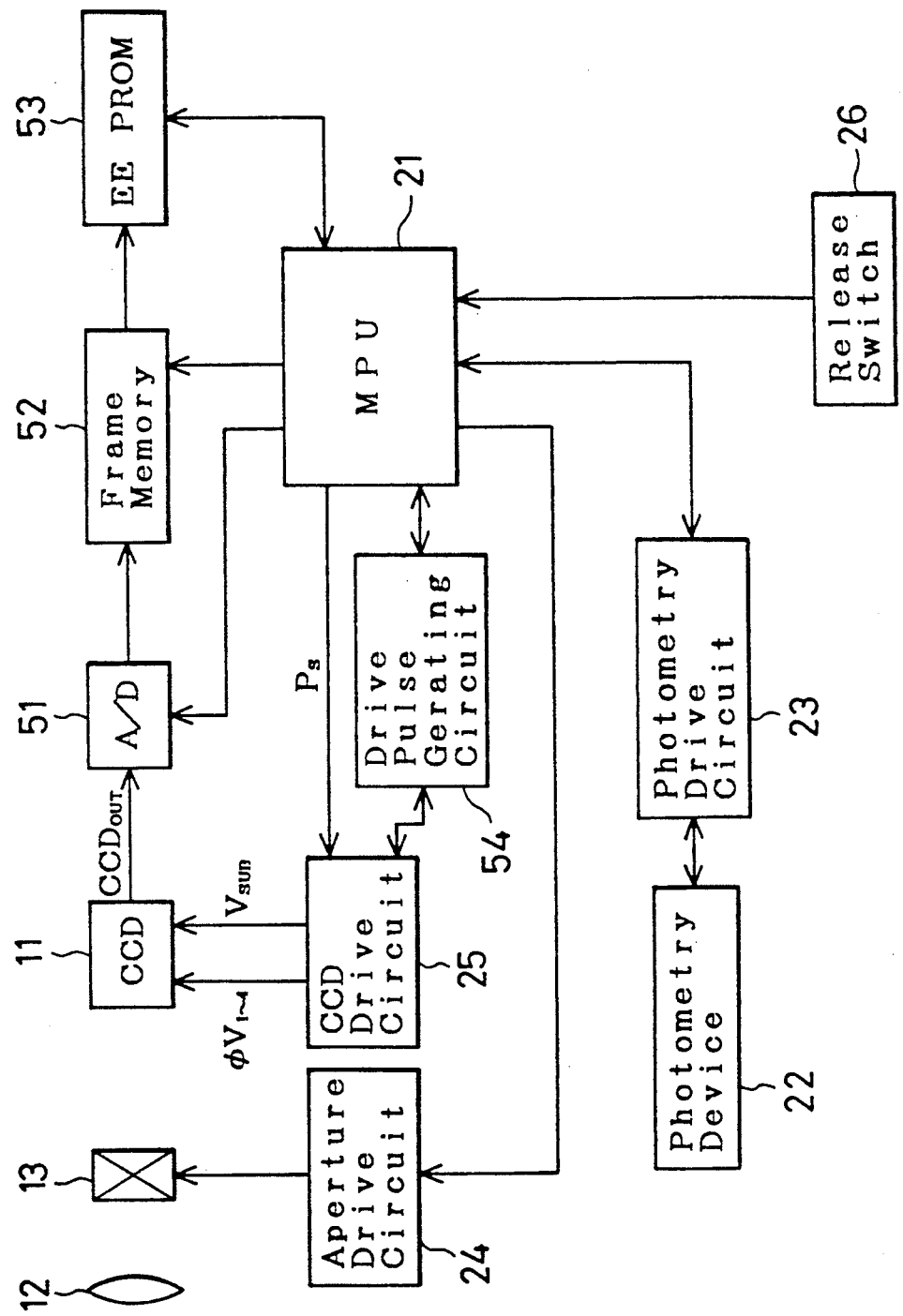
FIG. 1 is a block diagram showing a construction of an embodiment of a control device for an imaging device according to the present invention.

The present invention will now be described with reference to embodiments shown in the drawings.

FIG. 1 is a block diagram showing a construction of an embodiment of a control device for an imaging device according to the present invention.

Light reflected by an object (not shown) enters a CCD (Charge Coupled Device) 11 or an imaging device through a taking lens 12 and an aperture 13, whereby an image signal corresponding to the object is formed in the CCD 11, which then outputs the image signal to an A-D converter 51. The image signal is converted to digital form by the A-D converter 51, and once temporarily stored in a frame memory 52.

The data stored in the frame memory 52 may be inputted to and written in an EEPROM (Electrically Erasable Programable ROM) 53, or may be converted back to an analog signal by a D-A converter (not shown) and then frequency-demodulated to be recorded in a video floppy disk (not shown).

A control circuit 21, which may comprise, for example, a microcomputer (MPU), drives a photometry device 22 through use of a photometry drive circuit 23, whereby the photometry process is carried out. When a results of the photometry process are obtained, the control circuit 21 controls an aperture drive circuit 24 so that the aperture 13 is operated accordingly. The control circuit 21 also controls a drive pulse generating circuit 54 so that a CCD drive circuit 25 outputs drive signals to the CCD drive circuit 25, whereby the CCD 11 is operated.

A release switch 26 is operated when carrying out a photographing operation.

Figure 2:
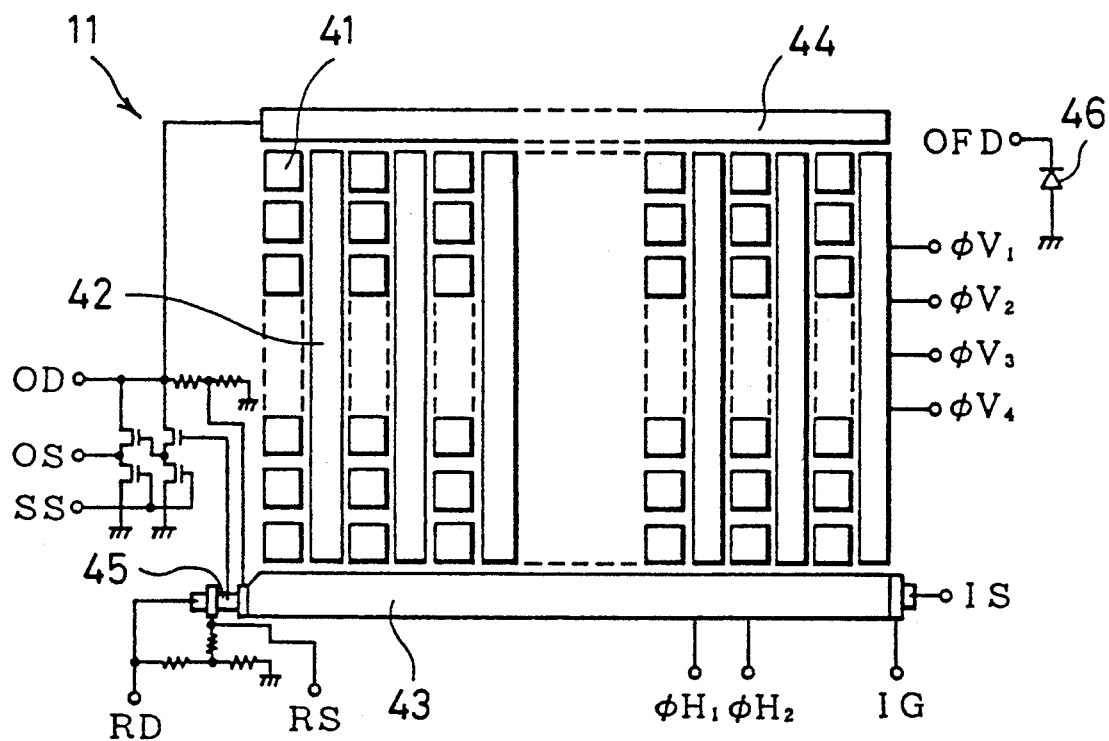
FIG. 2 is a block diagram showing a construction of a CCD.

FIG. 2 shows a construction of the CCD 11. In this drawing, a photodiode 41 is provided which corresponds to each pixel, and outputs the electric charge corresponding to an amount of light entering thereto. A vertical transfer CCD 42 is provided adjacent to the linear array of the photodiodes 41, and transfers an electric charge generated at the photodiodes 41 to a horizontal transfer CCD 43 or a discharge drain 44. A floating diffusion amplifier (FDA) 45 is connected to the horizontal transfer CCD 43, and changes an electric charge transferred from the horizontal transfer CCD 43 to a voltage, and outputs this voltage. An overflow drain 46 is provided for discharging an overflow of electric charges caused by an excessive irradiation of light.

The operation of the above embodiment is described below with reference to the timing chart shown in FIG. 3.

When the release switch 26 is presed in half way as shown by the reference R1, the control circuit 21 drives the photometry device 22 through use of the photometry drive circuit 23, whereby the photometry device 22 measures a state of exposure of an object as shown by the reference PH. Then, the control circuit 21 calculates the exposure of the object in accordance with an output of the photometry device 22.

When the release switch 26 is then fully depressed as shown by the reference R2, the control circuit 21 controls the aperture drive circuit 24 in accordance with a result of the calculation of the exposure, whereby the aperture 13 is opened as shown by the reference AP. Accordingly, the quantity of light passing through the taking lens 12 is adjusted to a proper value by the aperture 13, and allowed to enter the CCD 11.

The control circuit 21 controls the CCD drive circuit 25, which supplies a vertical synchronizing signal VD, a horizontal drive signal, and 4-phase vertical drive signals $\phi V1$ through $\phi V4$ which are synchronized with a horizontal synchronizing signal $\phi H_1$, $\phi H_2$, to the CCD 11. Hereinafter, the signals $\phi V1$ through $\phi V4$ are called "drive signals".

Figure 4:
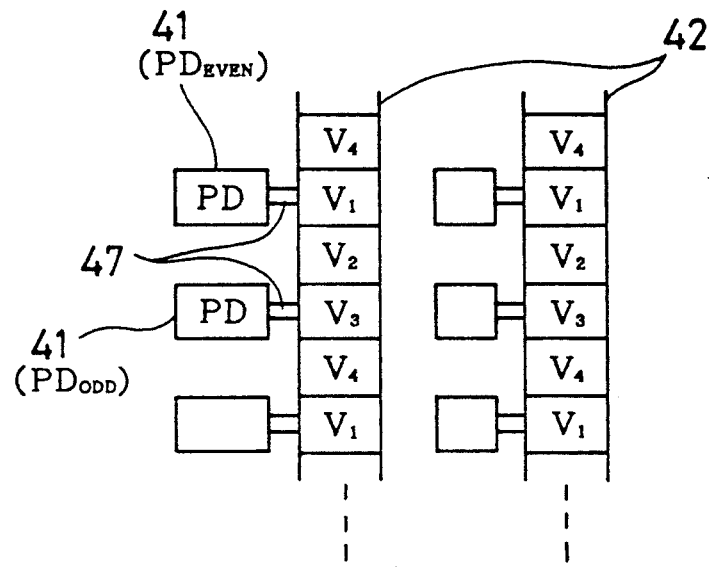
FIG. 4 is a block diagram showing a main part of the CCD.

As shown in FIG. 4, the vertical transfer CCD 42 is provided with four electrodes V1 through V4, which are repetitiously arranged along the vertical transfer CCD 42, for a 4-phase drive. The photodiodes 41 are connected to the electrodes V1 and V3, respectively, through transfer gates (TG) 47. Electric charges accumulated at the photodiodes 41 are transferred to, and then along, the vertical transfer CCD 42 by controlling the electric voltage and phase of the drive signals applied to the electrodes V1 through V4.

The control circuit 21 first brings the drive signals $\phi V1$ through $\phi V4$ to a low level, before a photographing operation is carried out (i.e., before an electronic shutter is operated), and thus a potential well is extinguished to thereby prevent an accumulation of dark current at the vertical transfer CCD 42.

Figure 5:
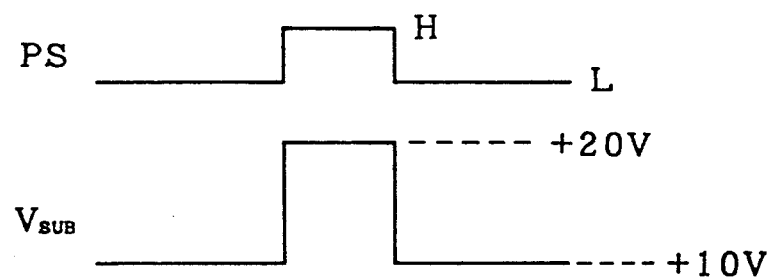
FIG. 5 is a timing chart showing signals PS and VSUB.

Then, the control circuit 21 outputs a signal PS to the CCD drive circuit 25, whereby a signal VSUB is changed to a high level, as shown in FIG. 5. As a result, all electric charges accumulated at the photodiodes 41 are made to flow to a substrate provided under the photodiodes 41. Thereafter, electric charges corresponding to an object to be photographed can be accumulated at the photodiodes 41 of the CCD 11.

Figure 3:
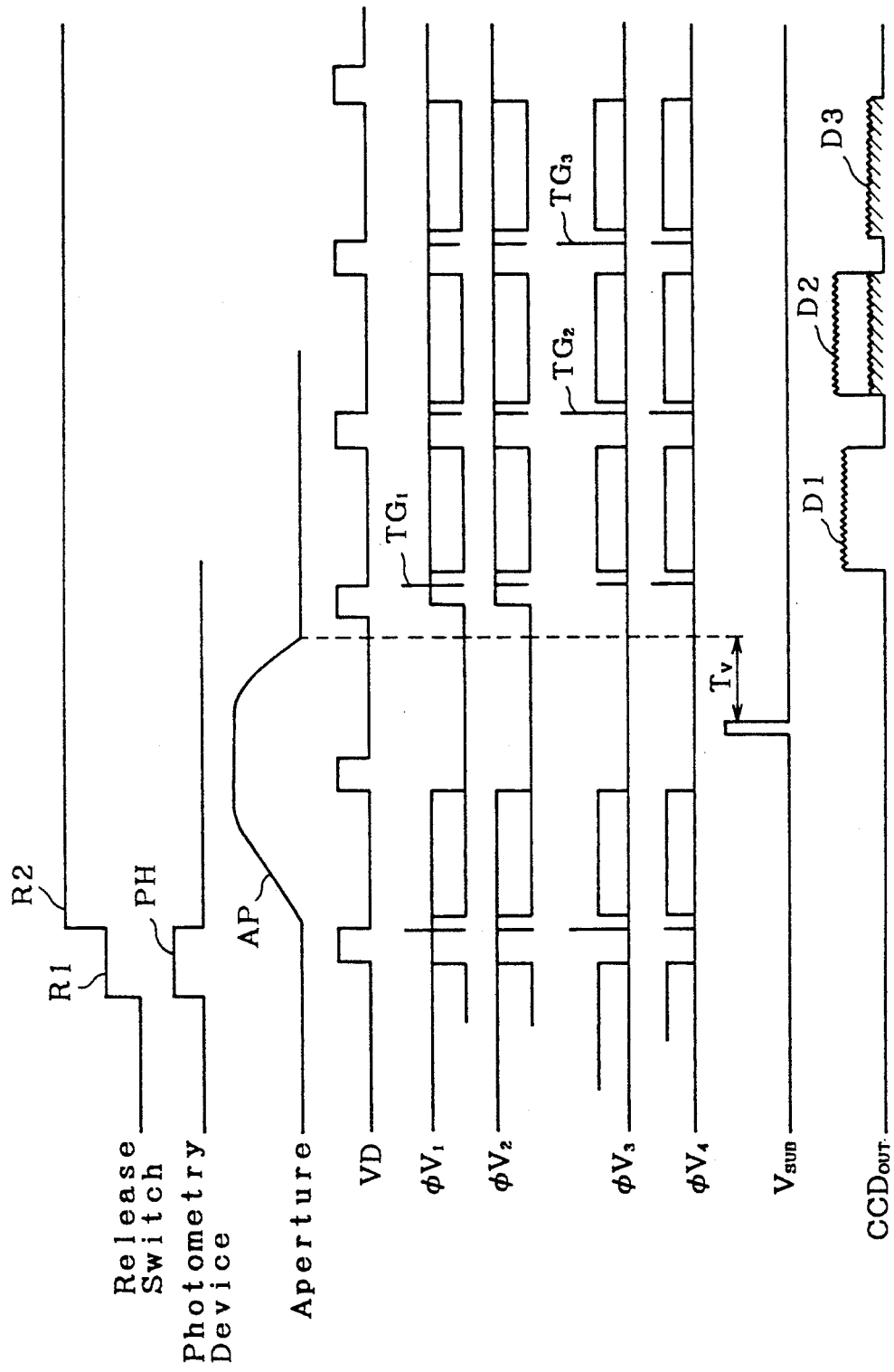
FIG. 3 is a timing chart showing an operation of the first embodiment.

Further, when a predetermined time TV, which is determined in accordance with a rsult of the photometry process, has elapsed, the control circuit 21 controls the aperture drive circuit 24 to close the aperture 13 as shown in FIG. 3. Namely, an effect equivalent to an operation of an electric shutter is obtained for the time TV.

Then, after the aperture 13 is closed, a signal TG1 as an electric charge transfer pulse of the even photodiodes 41 ($PD_{EVEN}$) is applied to the electrode V1 of the vertical transfer CCD 42, in the form of the drive signal $\phi V1$. As a result, an electric charge which has been accumulated at the odd photodiodes 41 ($PD_{EVEN}$) corresponding to an even number horizontal scanning line is transferred to the electrode V1 of the vertical transfer CCD 42 as an image signal of a first field. This image signal is successively transferred along the electrodes V1 through V4 of the vertical transfer CCD 42, by successively changing the levels of the drive signals $\phi V1$ through $\phi V4$, to be thereby inputted to the A-D converter 51. The image signal is then A-D converted by the A-D converter 51 and written in the frame memory 52, as shown by the reference D1 in FIG. 3.

In the same way as described above, in the next field, a signal TG2 is applied to the electrode V3 of the vertical transfer CCD 42, in the form of the drive signal $\phi V3$. As a result, an electric charge which has been accumulated at the odd photodiode 41 ($PD_{ODD}$) corresponding to an odd number horizontal line is transferred to the electrode V3 of the vertical transfer CCD 42 as an image signal of a second field. This image signal is also successively transferred along the electrodes V1 through V4 of the vertical transfer CCD 42, by successively changing the levels of the drive signals $\phi V1$ through $\phi V4$, to be thereby inputted to the A-D converter 51. The image signal is A-D converted by the A-D converter 51, and then written in the frame memory 52, as shown by the reference D2 in FIG. 3.

Further, in a third field following the two fields described above, a signal TG3 is applied to the electrode V3, in the form of the drive signal $\phi V3$. As a result, an electric charge which has been accumulated at the odd photodiodes 41 ($PD_{ODD}$) is transferred to the electrode V3. This transferred signal corresponds to a period for which the aperture 13 is closed, and therefore, does not correspond to an image signal of the object but to a dark current component. This signal is also successively transferred along the electrodes V1 through V4 of the vertical transfer CCD 42, by successively changing the levels of the drive signals $\phi V1$ through $\phi V4$, to be thereby inputted to the A-D converter 51. The dark current signal is converted by the A-D converted 51, and is then written in the frame memory 52, as shown by the reference D3 in FIG. 3.

As described above, the image signal of the second field includes a dark current component and a image signal component of the original object. Therefore, the control circuit 21 reads data of the second and third fields and then subtracts data (a dark current component) of the third field from the data of the second field, whereby an image signal of the original first frame is generated. This data obtained by the above calculation, and the data of the first field stored in the frame memory 52, are transferred and inputted to the EEPROM 53 as a one frame image signal, and then, utilized as data to be recorded in a magnetic disk, or for monitoring a display of a photographed image.

Therefore, as can be seen from the above description, an image having less noise is obtained according to the above embodiment.

Although the embodiments of the present invention have been described herein with reference to the accompanying drawings, obviously many modifications and changes may be made by those skilled in this art without departing from the scope of the invention.

I claim:

1. A device for controlling an imaging device which, while in a frame mode, outputs an image signal which represents an image of an object and comprises a first field and a second field, the first field and the second field forming one frame, said control device comprising:

an aperture for controlling exposure of said imaging device; and means for eliminating, after said aperture is closed, an effect of dark current generated in said imaging device from an image signal of said second field, whereby one frame of said image signal is formed by a combination of said first field and said second field from which the effect of the dark current is eliminated, wherein said eliminating means obtains a first image signal from said first field, and a second image signal by subtracting a dark current component from an image signal obtained from said second field, and outputs said first image signal and second image signal as a one frame image signal corresponding to said image.

2. A control device according to claim 1, wherein said dark current component is obtained from a signal of a third field which follows said first and second fields and corresponds in time to closing of said aperture.

3. The device according to claim 2, wherein said signal of said third field is obtained by light-receiving means provided for obtaining an image signal of said second field.

4. The device according to claim 2, further comprising first light-receiving means for producing said image signal of said first field, and second light-receiving means for producing said image signal of said second field, said third field being obtained by said second light-receiving means.

5. The device according to claim 1, wherein said image signal of said first field is obtained after an exposure time has elapsed, said image signal of said second field is obtained after said image of said first field is obtained, and said dark current component is determined after said image of said second field is obtained.

6. The device according to claim 1, further comprising a plurality of photodiodes including a first set of photodiodes and a second set of photodiodes, said image signal of said first field being obtained by transferring electric charges accumulated on said first set, said image signal of said second field being obtained by transferring electric charges accumulated on said second set, and said dark current component being obtained by transferring electric charges accumulated on said second set after transfer of the electric charges to obtain said image signal of said second field.

7. The device according to claim 1, wherein photodiodes of said first set are positioned in an interlaced manner with respect to photodiodes of said second set.

8. The device according to claim 1, wherein said imaging device displays an image corresponding to said first field before displaying an image corresponding to said second field.

9. A device for controlling an imaging device which, while in a frame mode, outputs an image signal which represents an image of an object and comprises a first field and a second field, the first field and the second field forming one frame, said imaging device having first light-receiving means for receiving an image signal corresponding to the first field, and second light-receiving means for receiving an image signal corresponding to the second field, said control device comprising:

an aperture for controlling exposure of said image device; and control means for controlling said imaging device such that, after said aperture is closed, said imaging device outputs image signals representing said first and second fields, and thereafter, outputs data representing a third field which corresponds to a dark current, said data of said third field being obtained by said second light-receiving means after said aperture is closed, said control means outputting both a signal which is obtained by subtracting said data of said third field from said image signal of said second field, and said image signal of said first field, in the form of a one frame image signal.

10. A device for controlling an imaging device which outputs an image signal corresponding to the image of an object, said imaging device having first light-receiving means for receiving an image signal corresponding to a first-field, and second light-receiving means for receiving an image signal corresponding to a second field, said control device comprising:

an A-D converter for A-D converting an output of said imaging device;

a memory for storing at least one frame of data outputted by said A-D converter;

a photometry circuit for measuring exposure of said object;

an aperture for controlling exposure of said imaging device in accordance with an output of said photometry circuit; and control means for controlling said imaging device in such a manner that, after said aperture is closed, said imaging device outputs, after outputting image signals of said first and second fields corresponding to said object, data of a third field corresponding to a dark current, said data of said third field being obtained by said second light-receiving means after said aperture is closed, said control means outputting a difference signal obtained by subtracting said data of said third field from said image signal of said second field, and outputting said image signal of said first field, said difference signal and said image signal of said first field forming a one frame image signal.

11. A device for controlling an imaging device having a first set of photodiodes corresponding to a first field and a second set of photodiodes corresponding to a second field, said control device comprising:

an aperture for controlling exposure to said imaging device;

means for reading electric charges accumulated at said first and second sets of photodiodes;

means for controlling said reading means to read said electric charges, said control means controlling said reading means such that, after said aperture is closed, said reading means reads electric charges accumulated at said first set of photodiodes to form an image signal of said first field, subsequently reads electric charges accumulated at said second set of photodiodes to form an image signal of said second field, and then reads electric charges accumulated at said second set of photodiodes to obtain a dark current component;

means for subtracting said dark current component from said image signal of said second field to thereby obtain a corrected image signal of said second field; and means for forming a single frame image signal in accordance with said image signal of said first field and said corrected image signal of said second field.

12. A device for controlling an imaging device having a first set of photodiodes corresponding to one field and a second set of photodiodes corresponding to another field, said control device comprising:

an aperture for controlling exposure to said imaging device;

means for reading electric charges accumulated at said first and second sets of photodiodes;

means for controlling said reading means to read said electric charges, said control means controlling said reading means such that, after said aperture is closed, said reading means reads electric charges accumulated at said first set of photodiodes to form an image signal of said one field, subsequently reads electric charges accumulated at said second set of photodiodes to form an image signal of said other field, and then reads electric charges accumulated at said second set of photodiodes to obtain a dark current component;

means for substracting said dark current component from said image signal of said other field to thereby obtain a corrected image signal of said other field; and means for forming a single frame image signal in accordance with said image signal of said one field and said corrected image signal of said other field.

* * * * *

UNITED STATES PATENT AND TRADEMARK OFFICE
CERTIFICATE OF CORRECTION

PATENT NO. : 5,216,511

DATED : June 1, 1993

INVENTOR(S) : Tani

It is certified that error appears in the above-identified patent and that said Letters Patent is hereby corrected as shown below:

On the title page, item [73] Assignee, change "Kokaku" to --Kogaku--.

Signed and Sealed this

Seventh Day of May, 1996

Attest:

BRUCE LEHMAN

Attesting Officer

Commissioner of Patents and Trademarks